United States Patent [19]

Schafbuch

[11] 3,800,880
[45] Apr. 2, 1974

[54] CLEANING ATTACHMENT FOR ROTARY TILLER

[76] Inventor: Larry N. Schafbuch, Box 79, Ladora, Iowa 52251

[22] Filed: July 5, 1972

[21] Appl. No.: 269,217

Related U.S. Application Data

[63] Continuation-in-part of Ser. No. 218,768, Jan. 18, 1972, abandoned.

[52] U.S. Cl............ 172/39, 172/112, 172/508, 172/610, 15/82, 280/152 R
[51] Int. Cl............................................. A01b 33/02
[58] Field of Search ............ 172/39, 112, 113, 508, 172/547, 606, 610; 37/DIG. 2; 15/82; 56/255, 294, 320.1, 320.2

[56] References Cited
UNITED STATES PATENTS

| 514,066 | 2/1894 | Drader | 172/547 |
|---|---|---|---|
| 1,209,354 | 12/1916 | Strand | 172/610 |
| 1,653,905 | 12/1927 | Harrison | 37/DIG. 2 |
| 2,491,793 | 12/1949 | Anderson | 37/DIG. 2 |
| 2,641,100 | 6/1953 | Sylvester | 56/255 |
| 2,812,872 | 11/1957 | Perkins et al. | 37/DIG. 2 |
| 3,011,793 | 12/1961 | McElhinney et al. | 172/112 UX |
| 3,029,582 | 4/1962 | De Halleux | 56/320.2 X |
| 3,145,519 | 8/1964 | Pearson | 56/320.2 |
| 3,147,577 | 9/1964 | McClellan et al. | 56/294 X |

FOREIGN PATENTS OR APPLICATIONS

| 252,068 | 5/1963 | Australia | 172/112 |

Primary Examiner—Robert E. Pulfrey
Assistant Examiner—Paul T. Sewell

[57] ABSTRACT

A cleaning attachment for rotary tillers of the type having a protecting hood covering the rotary tiller blades to prevent upward discharge of dirt and mud therefrom. A grid is attached to the hood and plates are mounted for transverse movement so as to scrape earth and mud therefrom as the tiller is used in the field.

15 Claims, 9 Drawing Figures

PATENTED APR 2 1974 3,800,880

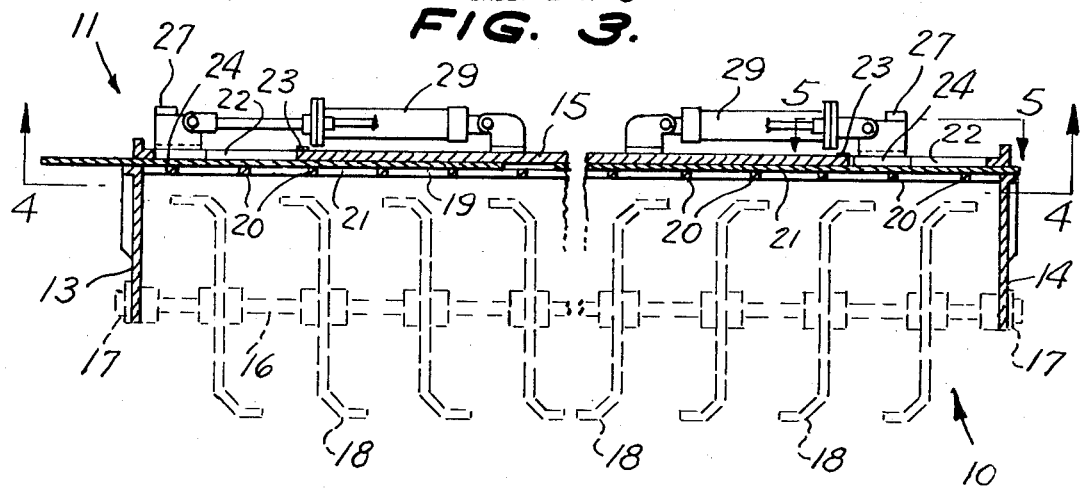
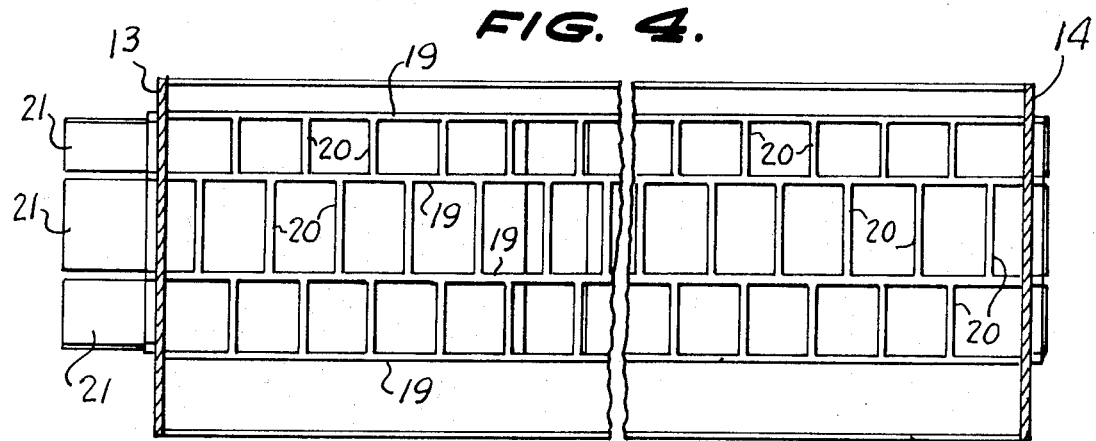
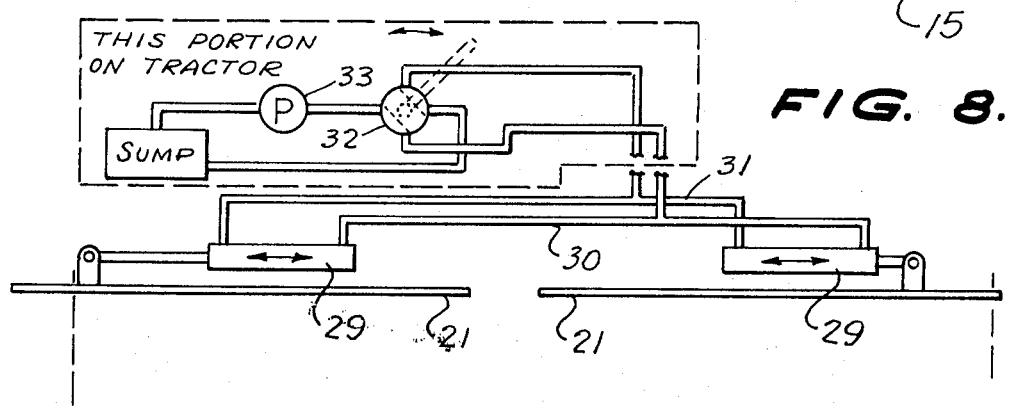

CLEANING ATTACHMENT FOR ROTARY TILLER

This application is a continuation-in-part of my earlier filed co-pending patent application, U.S. Ser. No. 218,768 filed Jan. 18, 1972, now abandoned.

The primary object of the invention is to provide a means for receiving and discharging unwanted mud and dirt normally collecting on the hood of a rotary tiller.

Other objects and advantages will become apparent in the following specification when considered in light of the attached drawings.

FIG. 3 is a transverse vertical sectional view taken along the line 3 — 3 of FIG. 2 looking in the direction of the arrows;

FIG. 4 is a generally horizontal transverse sectional view taken along the line 4 — 4 of FIG. 3 looking in the direction of the arrows;

FIG. 8 is a piping diagram of the hydraulic circuitry of the invention.

Figure 1:
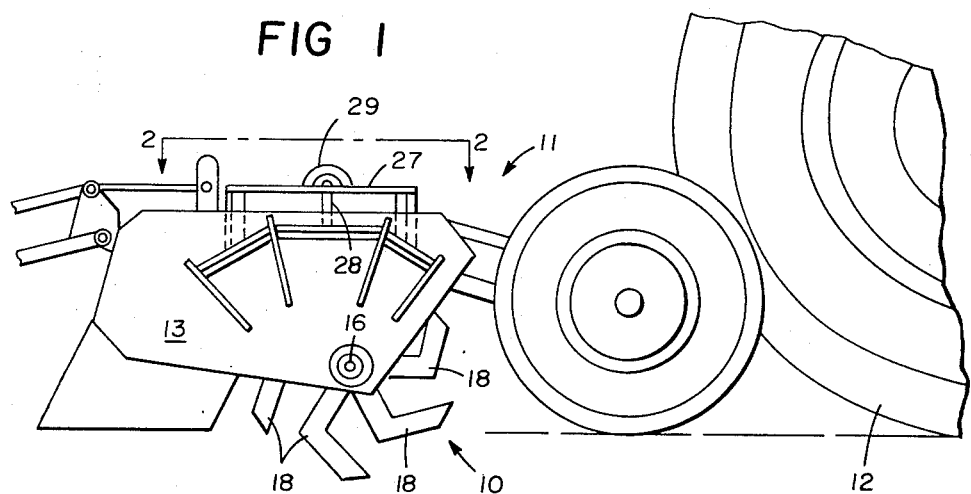
FIG. 1 is a side elevation of the invention.

Referring now to the drawings in detail wherein like reference characters indicate like parts throughout the several figures, the reference numeral 10 indicates generally a mud cleaner constructed in accordance with the invention.

The mud cleaner 10 is used with a rotary tiller generally indicated at 11 and adapted to be drawn behind a tractor 12. The rotary tiller 11 includes a pair of spaced apart parallel side plates 13, 14 connected by a transversely extending hood 15.

A shaft 16 extends between the side plates 13, 14 and has its opposite ends journalled in bearings 17 carried by the side plates 13, 14. A plurality of tiller teeth 18 are mounted on the shaft 16 to rotate therewith. The shaft 16 is power driven by any suitable means (not shown).

Rotation of the shaft 16 and the tiller blades 18 throws soft dirt and mud upwardly therefrom with the hood 15 intercepting the dirt and mud to prevent it from being thrown too far.

Under normal operation conditions, the dirt and mud thrown up by the blades 18 will coat on the undersurface of the hood 15 and gradually build-up sufficiently to interfere with the operation of the blades 18.

The tiller cleaner 10 includes a plurality of transversely extending spaced apart, parallel bars 19 rigidly secured to the underside of the hood 15 and extending downwardly therefrom. A plurality of spaced apart, parallel scraper blades 20 extend perpendicularly to the bars 19 and are rigidly secured thereto at their opposite ends by welding or the like. The scraper blades 20 are spaced beneath the hood 15 and support a plate 21 thereon positioned between the bars 19. The plates 21 are formed of two pieces each covering substantially half of the width of the rotary tiller 11.

The hood 15 is provided with a plurality of generally rectangular apertures 22 extending generally transversely thereof and positioned adjacent the opposite ends of the hood 15 closely adjacent to the end plates 13, 14. The apertures 22 have a frame 23 extending there about for reasons to be assigned.

A generally rectangular block 24 is positioned for reciprocation in each of the apertures 22 and has a pair of oppositely disposed flanges 25 which are adapted to engage the frame 23 as the block 24 reciprocates. The block 24 is rigidly secured to the plate 21 by bolts 26 extending therethrough.

A generally horizontal yoke bar 27 is positioned to overlie three of the blocks 24 at each end of the rotary tiller 11 and has a central finger 28 with its upper end rigidly secured thereto and its lower end rigidly secured to the central block 24. Side fingers 29 depend from opposite ends of the bar 27 and are secured to the blocks 24 underlying the opposite ends of the bar 27. A pair of oppositely disposed hydraulic cylinders 29 are secured at one end to the housing 15 and have their opposite ends connected to the fingers 28 so that reciprocation of the hydraulic cyliners 29 will cause the plates 21 to reciprocate on the scraper blades 20.

As can be seen in FIG. 8, the hydraulic cylinders 29 have a conduit 30 connecting the rear end of one of the cylinders 29 to the front end of the other cylinder 29 and a second conduit 31 connects the opposite ends of the cylinders 29. The conduits 30, 31 extend to a control valve 32 which receives hydraulic fluid under pressure from a pump 33. The connection of the conduits 30 and 31 is such that all of the plates 21 reciprocate in the same direction so that the spacing between the plates 21 arranged in aligned relation stays constant.

Figure 2:
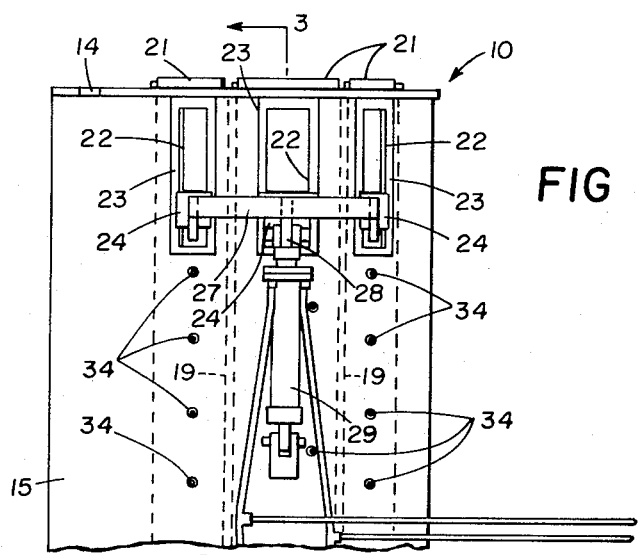
FIG. 2 is a top plan view of the invention.
Figure 2A:
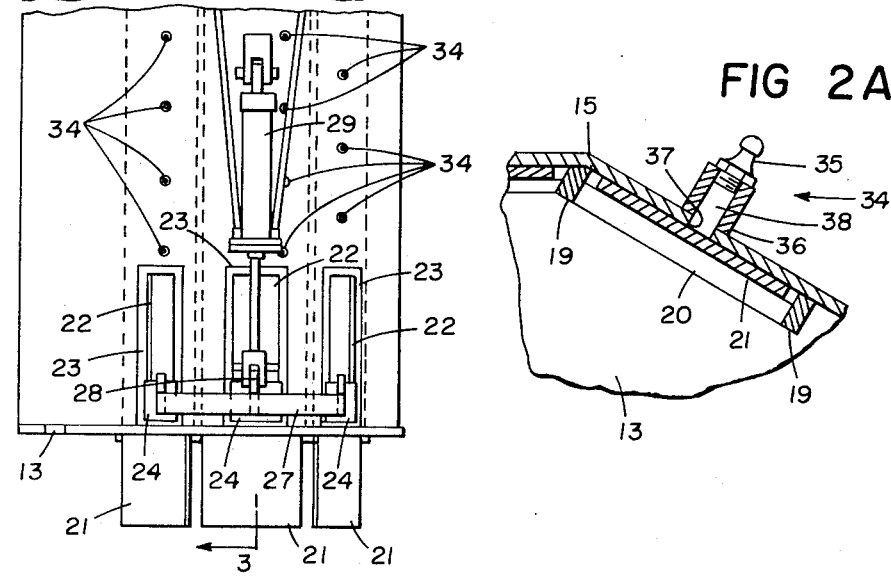
FIG. 2A is an elevation view, partly in section, of one of the lubrication fittings for the scraper plates.
Figure 5:
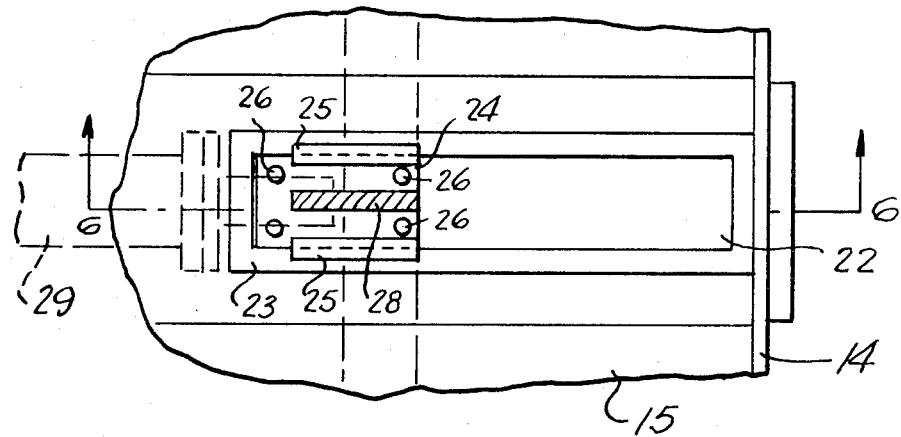
FIG. 5 is an enlarged fragmentary horizontal sectional view taken along the line 5 — 5 of FIG. 3 in the direction of the arrows.
Figure 6:
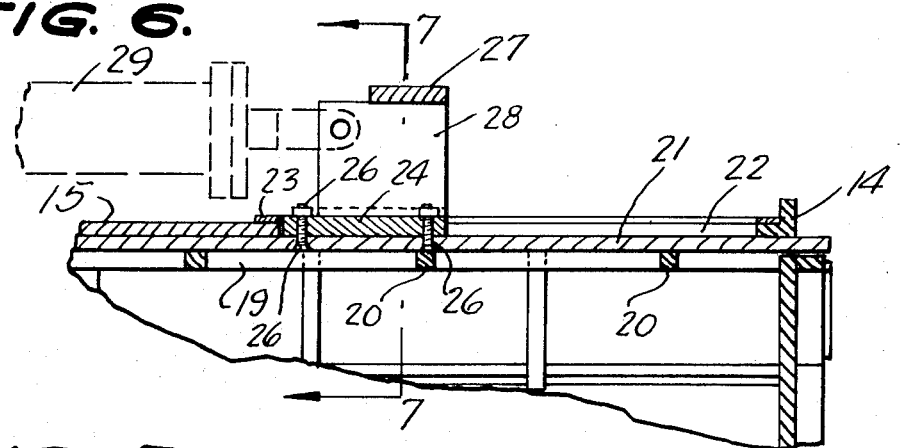
FIG. 6 is a fragmentary sectional view taken along the line 6 — 6 of FIG. 5 looking in the direction of the arrows.
Figure 7:
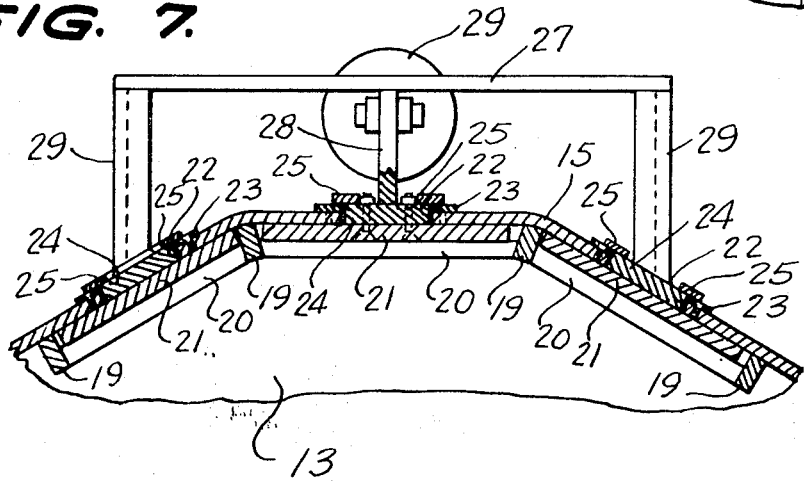
FIG. 7 is a longitudinal vertical sectional view taken along the line 7 — 7 of FIG. 6 looking in the direction of the arrows.

As previously described, the reciprocable plates 21 are positioned between the scraper blades 20 and the underside of the hood 15, and the spaces between the surfaces become filled with dirt, mud and other foreign material during operation of the rotary tiller. If this foreign material is allowed to harden for any length of time, it can become difficult to move the plates 21 even under power of the hydraulic cylinders 29. Therefore, the operator frequently may have to flush the machine with water to remove this foreign material. Since this may be inconvenient if the tiller is being used for an extended time in the field, I prefer to provide the machine with means for lubricating the surfaces between plates 21, the hood 15 and the scraper blades 20. In FIG. 2, there are represented a plurality of lubrication fittings 34 spaced along the upper surface of hood 15 above the approximate center of each of the plates 21. The number and space of fittings 34 should be such to allow the lubricant to be distributed over and around the surfaces and edges of the plates 21. I prefer to use a "roller track" type grease, such as "Red Giant" brand. As best seen in FIG. 2A, the grease is applied through grease zerks 35 of any suitable type each of which is preferably mounted in a hollow support 36 affixed to the upper surface of hood 15 directly above an opening 37 extending through the hood 15. The supports 26 eliminate any possible interference between the zerks 35 and the movable plates 21 and also provide reservoirs 38 for the grease.

When the tiller is being used, the grease should be applied regularly (e.g., daily) to plates 21 through fittings 34. The frequency of lubrication will depend upon the conditions under which the tiller is being operated.

Regular lubrication with a suitable grease will assure free movement of the plates 21 by reducing the friction between the plates 21 and adjacent surfaces and also by preventing the drying and hardening of material that becomes lodged between the surfaces. To some extent, the grease also serves to seal the spaces between the plates 21 and hood 15 thus minimizing the amount of dirt, etc. that can enter into these spaces. Regular lubrication will also force out the old grease which will carry with it any foreign material thus keeping the surfaces as clean as possible.

In the use and operation of the invention, the plates 21 are reciprocated as often as is required to remove dirt collecting thereon by scraping it off on the scraper blades 20.

The actuation of the plates 21 has been illustrated as being by hand-controlled hydraulic cylinders, however, it should be understood that any power means of reciprocating the plates and controlling the reciprocation may be used.

Having thus described the preferred embodiment of the invention, it should be understood that numerous structural modifications and adaptations may be resorted to without departing from the spirit of the claims.

1. A cleaning attachment for rotary tillers of the type having an elongated hood overlying a rotatable tiller blade, said attachment comprising in combination: a plurality of spaced apart scraper blades mounted in spaced relationship to the underside of the hood and extending generally normal to the length of the hood, plate means for collecting mud and the like supported on said scraper blades beneath the hood, said plate means and scraper blades being movable reciprocally relative to each other, transversely with respect to the length of the blades and means for controllably providing said relative reciprocal movement.

2. The device of claim 1 wherein lubrication means is affixed to said hood to provide for lubricant to be introduced between the said plate means and said hood.

3. The device of claim 2 in which said lubrication means includes a plurality of grease fittings mounted on said hood and providing for the flow of grease through said fittings to the space between said plate means and said hood.

4. A hood cleaning attachment for rotary tillers of the type including a protective hood overlying the tiller blades, said attachment comprising a plurality of transversely extending spaced-apart parallel bars secured to the underside of said hood, a plurality of plates mounted beneath said hood for reciprocating movement between said bars and said hood, a plurality of scraper blades having their opposite ends rigidly secured to said bars and arranged in spaced apart parallel relation, said scraper blades supporting said plates for said reciprocating movement, and means connected to said plates for reciprocating said plates.

5. The device as claimed in claim 4 wherein said plates are arranged in longitudinally spaced pairs, with all of said plates reciprocating simultaneously in the same direction.

6. The device as claimed in claim 4 wherein said plurality of transversely extending bars form three plate receiving channels, and the scraper blades supporting said plates for scraping dirt there-from comprises a plurality of scraper blades arranged in spaced parallel relation in each channel with the blades in one channel non-aligned with the blades in an adjacent channel.

7. The device as claimed in claim 4 including a plurality of generally rectangular apertures formed in said hood overlying said plate, and the means for reciprocating said plates extends upwardly through said apertures.

8. The device as claimed in claim 7 including a frame secured to said hood and surrounding each of said apertures, and the means reciprocating said plates is slidably mounted on said frames.

9. The device of claim 4 wherein lubrication means is affixed to said hood to provide for lubricant to be introduced between said plates and said hood.

10. A hood cleaning attachment for agricultural implements of the type including a protective hood overlying the operative part of the implement, said attachment comprising a plurality of plates mounted for movement beneath the hood, power means operatively connected to said plates for causing said plates to move relative to said hood, and a plurality of scraper blades extending across the path of movement of said plates for scraping foreign material from said plates as said plates are moved by said power means, said scraper blades being supported beneath said hood and supporting said plates for movement relative thereto.

11. The attachment of claim 10 in which lubrication means is affixed to said hood to provide for a lubricant to be introduced between said plates and said hood.

12. The attachment of claim 10 in which lubrication means is affixed to said hood to provide for a lubricant to be introduced between said plates and said hood.

13. The attachment of claim 10 in which said implement is a rotary tiller having a plurality of tiller blades rotatable about an axis extending transverse to the direction of movement of said implement, said hood extending over said blades with the undersurface of said hood having a plurality of flat surfaces in planes parallel to said axis, said flat surfaces being joined to provide a partial enclosure over said blades, there being one of said plates mounted beneath each of said surfaces and movable reciprocally along said surface, and said means engaging said plates to scrape foreign material from them includes at least one scraper blade extending across the path of movement of each of said plates.

14. The attachment of claim 13 in which lubrication means is affixed to said hood to provide for lubricant to be introduced between said plates and said flat surfaces that form the undersurface of said hood.

15. The attachment of claim 13 in which there are a plurality of said scraper blades extending across the path of movement of each of said plates, said scraper blades being spaced apart along said path a distance no greater than the amount of movement of a plate along the path.

* * * * *